June 6, 1933.  J. L. ADAMS, JR  1,913,322
METHOD AND APPARATUS FOR PRODUCING WELDED ARTICLES
Filed July 26, 1930   2 Sheets-Sheet 1
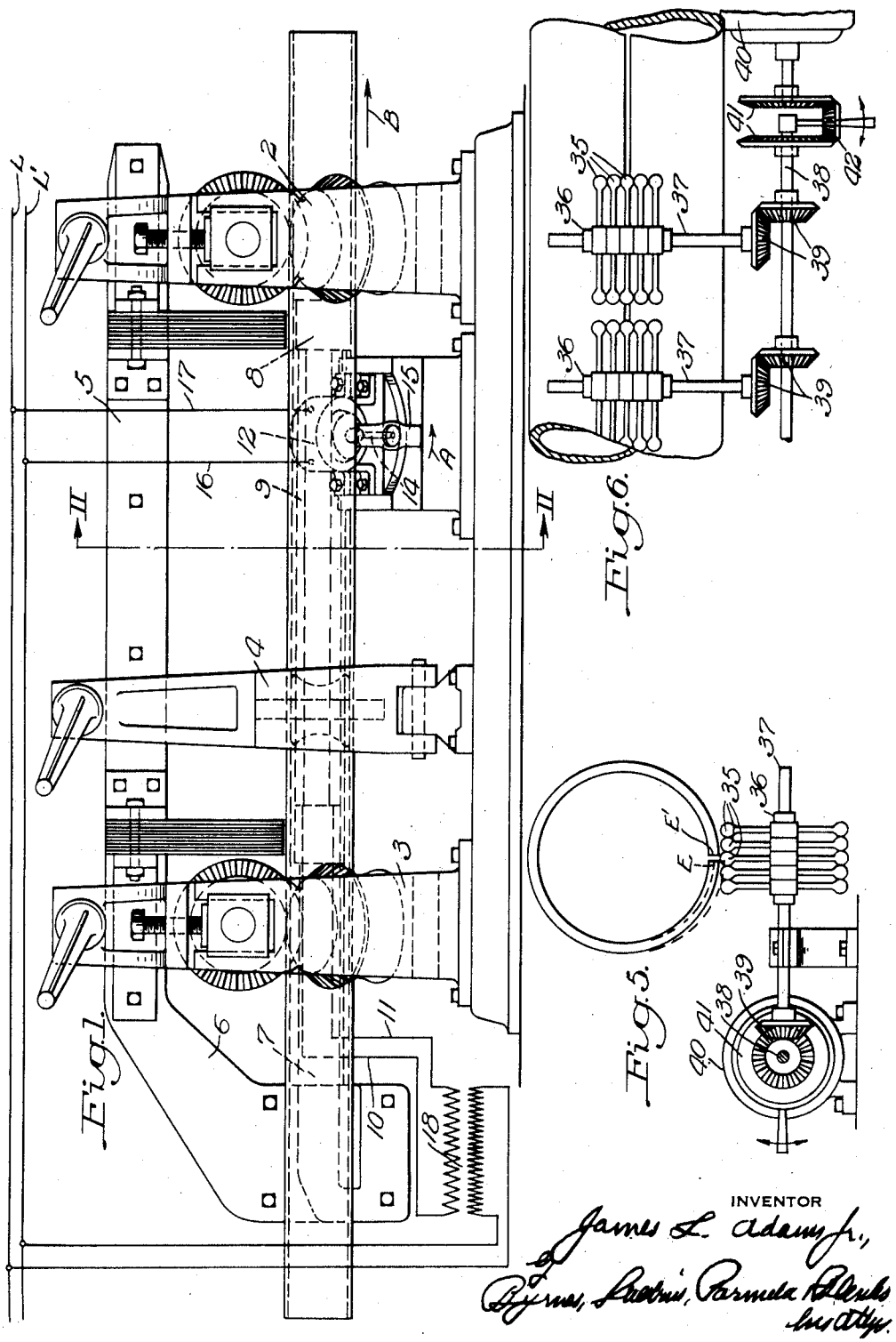

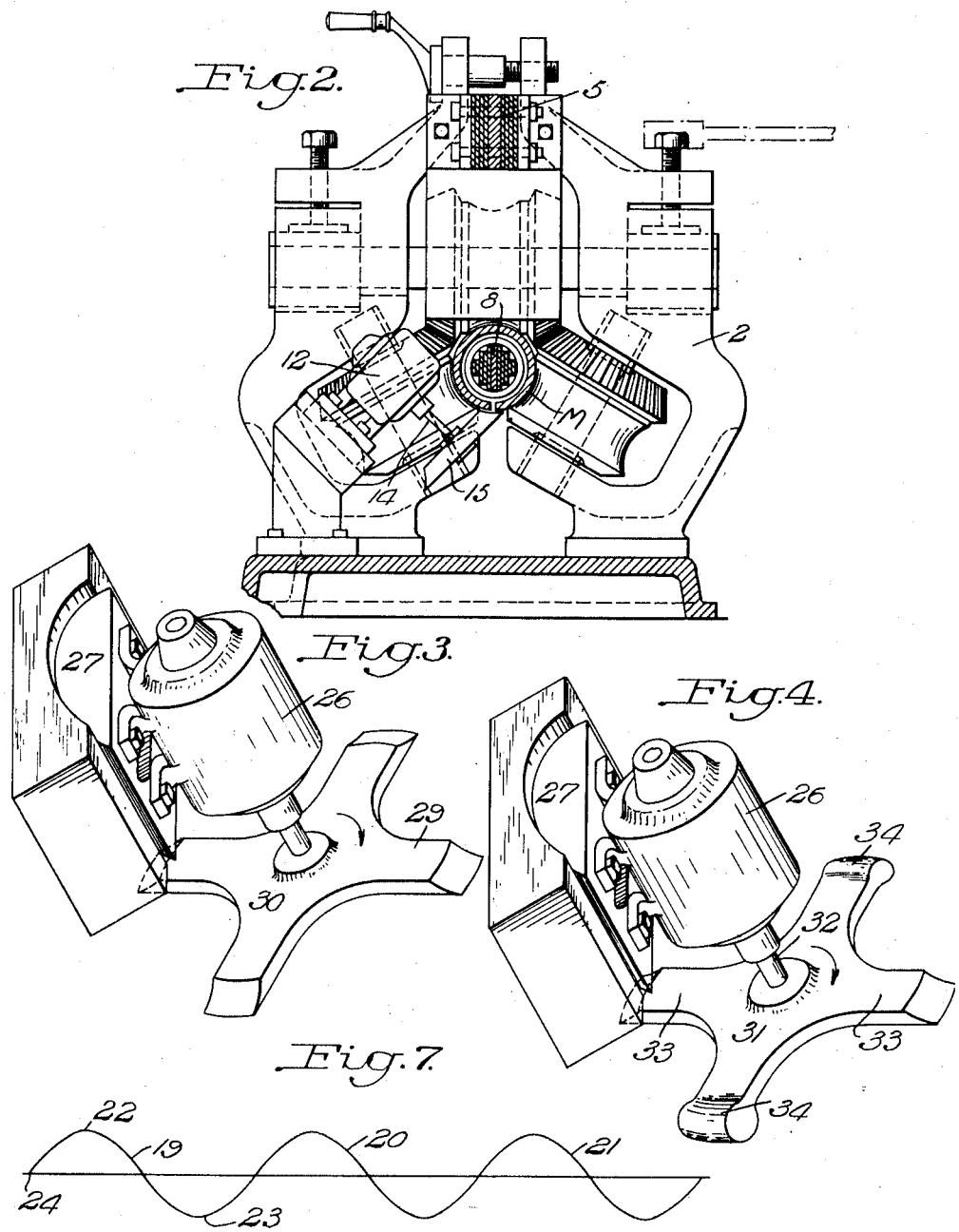

Patented June 6, 1933

1,913,322

UNITED STATES PATENT OFFICE

JAMES L. ADAMS, JR., OF YOUNGSTOWN, OHIO, ASSIGNOR TO THE YOUNGSTOWN SHEET AND TUBE COMPANY, OF YOUNGSTOWN, OHIO, A CORPORATION OF OHIO

METHOD AND APPARATUS FOR PRODUCING WELDED ARTICLES

Application filed July 26, 1930. Serial No. 470,879.

The present invention relates broadly to the art of welding, and more particularly to the art of electrical welding.

The production of welded articles, such for example as pipe and tubing, regardless of the method employed, or the particular apparatus utilized, has required accuracy of positioning of the portions to be welded as well as the application of welding pressure thereto. Whether the heating up of the portions to be welded is accomplished by the resistance method, the flash method, or a combination of both, difficulty has been encountered in the provision of suitable mechanism physically located within the heating zone and effective for properly positioning the edges, or for removing surplus or ejected material therefrom immediately prior to the final welding operation and closely adjacent the zone in which such welding is accomplished. This has been true for the reason that unless the edge aligning, or the material removing means were of refractory or other non-conducting material, it has been necessary to so subdivide the same and insulate them from their supporting structures as to preclude the possibility of short-circuiting to the adjacent portions of the material being welded.

Where, however, refractory materials have been utilized, the temperatures met with along the heating seam are such that no insulating materials known will stand up for more than a brief time period. This is especially true if in addition to the duty of removing surplus material of the character referred to, they are also called upon to perform the additional function of seam positioning. In any case, as soon as the refractory material becomes heated to a predetermined temperature, it becomes capable of conducting electricity to a greater or lesser extent.

In the case of metallic devices utilized in lieu of refractory materials, they have necessarily been operative within zones of very high temperatures, and although called upon to effect the removal of surplus material up to substantially the plane of the material being welded, it has been necessary to prevent the same from actually short-circuiting across the lips of the seam. The two conditions are obviously more or less directly in conflict, and it has been practically impossible in a commercial apparatus to effect their successful use under any normal methods of operation.

The present invention has for one of its objects the provision of an improved method and apparatus by which the difficulties heretofore encountered in the respects referred to are obviated.

In accordance with the present invention, I preferably provide toothed or substantially toothed metal removing and/or aligning means conveniently driven by a synchronous motor connected to the source of periodically varying current by means of which the welding temperatures are provided, whereby such means are always maintained in predetermined synchronous relationship to the instantaneous zero of current flow in the material being welded. It will hereinafter be more fully apparent that such a synchronous motor may either be connected directly across the periodically varying current line or, in special cases where considerable variation in the angle of lag of the current may occur between no load and full load operation, such synchronous motor may be connected in series with the main welding load line, and thus kept in step with the current impulses irrespective of the momentarily present angle of lag. If desired, such synchronous motor may be connected across the line, with a series component effect introduced by the addition of a suitable number and arrangement of series transformers.

It is well understood in the art that commercial induction welding systems are characterized by the utilization of a periodically varying current such, for example, as an alternating current of the desired frequency. Such a current between successive alternations rises from a substantially zero value to a maximum value, and thereafter returns to zero, so that at definite intervals any current flow induced thereby in the material being welded becomes, momentarily, substantially negligible. By so co-relating the action of an aligning and/or cleaning means to the current flow that such means will bridge the seam or gap in the material being welded only at periods when the current flow in the material is at such a substantially zero value, it is possible to obtain the results desired without in any wise interfering with the necessary heating of the material itself, and without any danger of burning up of the metal tool.

I have found that by utilizing a synchronous driving motor for the devices employed for the intended purpose, and suitably constructing these devices, it is possible after an initial adjustment or a proper preliminary setting of the tool devices, to maintain the operation thereof such that they will be effective only during intervals of substantially zero or negligible current flow in the material. This makes it possible to utilize metallic aligning and/or cutting devices, for example, without insulation near or across the seam, as distinguished from the use of insulating materials of refractory characteristics with all of the objections incident thereto. In addition to the objections previously referred to, refractory materials are characterized by extreme brittleness, poor edge-holding ability, and the like.

In the accompanying drawings I have shown, for purposes of illustration only, and more or less diagrammatically, certain preferred embodiments of the present invention. In the drawings:

Figure 1 is a longitudinal sectional view diagrammatically illustrating one form of apparatus constructed in accordance with the present invention;

Figure 2 is a transverse sectional view on the line II—II of Figure 1 and looking in the direction of the arrows;

Figure 3 is a perspective view of a slightly modified embodiment of the invention;

Figure 4 is a partial perspective view similar to Figure 3, but illustrating a slightly modified embodiment of the invention;

Figure 5 is a transverse sectional view similar to Figure 2, but illustrating a still further form of apparatus embodying my invention;

Figure 6 is a bottom plan view of the form of the invention illustrated in Figure 5; and Figure 7 is a diagrammatic illustrative view.

For purposes of a clearer understanding of the present invention, I have herein illustrated the same as applied to a welding apparatus of the general type disclosed and claimed in my co-pending application, Serial No. 297,962, filed August 7, 1928. Such an apparatus may comprise a welding roll stand 2 and a crushing and sizing roll stand 3, which roll stands are effective on opposite sides of a regulating stand 4. Carried by the stands 2 and 3 is a yoke 5 having an extension 6 secured to an inner torpedo-like structure 7 over which substantially tubular pre-formed material M is adapted to pass.

This torpedo-like structure at its right-hand end, as viewed in Figure 1, comprises an assembly including a core 8 with which co-operates a suitable coil structure 9. The coil structure has leads 10 and 11 extending therefrom and connected to a suitable source of current hereinafter described. With such a construction, the coil structure constitutes a primary source of current, while the secondary comprises the material being welded, the relationship of the parts being such that when the material encloses the coil structure a current flow is induced in the material for effecting the desired heating thereof.

The material, having been properly sized by the rolls in the crushing and sizing roll stand and having passed therethrough, is heated at its edge portions to the desired temperature for welding, and then passes to the welding rolls which exert the required pressure thereon for completing the weld. I have found that the general effectiveness of such an apparatus, as well as any welding apparatus adapted to perform the same general functions, is dependent to a very great extent upon the accuracy with which the edge portions of the material are maintained in the desired aligned position or relationship not only during the heating operation but also during the welding operation. In like manner, the strength characteristics of the finished seam depend to a very great extent upon the cleanliness, or freedom from extrusion material, of the outer surfaces of the edge portions of the material. It is also true that the appearance of the finished seam depends very materially upon the amount of such extruded or ejected metal which is allowed to remain along the seam line, the appearance being improved substantially in direct proportion as effective removal of such extrusion material is accomplished.

In accordance with my invention, I provide means which, depending upon the particular construction thereof, may be used entirely for an edge surface cleaning operation, entirely for an edge aligning or positioning operation, or for the simultaneous performance of both of these functions.

In the form of the invention illustrated in Figure 1 of the drawings, certain desirable results of the general character referred to are obtained by the provision of a synchronous motor 12, preferably disposed laterally of the material being welded so as to be out of the zone of intense heat set up therein, and in such position as not to be injured by the hot vapors and the metal particles extruded or thrown off during the heating operation. The armature shaft 14 of the motor extends downwardly below the material, in the case of a bottom seam-forming operation, and carries at its outer end a two blade scraping or cutting tool 15, each of the blades being of such shape as to span the seam and co-operate with the edge portions of the material. The synchronous motor is herein illustrated as having a direction of rotation indicated by the arrow A, such that the arms of the cutting tool are caused to rotate against, or in opposition to, the travel of the material being welded, but this direction of rotation, although preferred, is not absolutely essential. The direction of the material travel is indicated by the arrow B.

The leads 16 and 17 of the synchronous motor are illustrated as extending therefrom for connection to one or more phases of a suitable source of periodically variable primary current, indicated diagrammatically by the line wires L and L'. It will be understood, however, that while a two wire system is shown, the utility of the invention is in nowise limited thereto. These line wires are also indicated as constituting the source of current supply for a transformer 18 effective for feeding the coil structure 9. With such a construction, the synchronous motor will operate at all times approximately in synchronism with the potential pulses of the current flow induced in the material itself. It may be assumed by way of illustration that the line wires L and L' supply a 60 cycle alternating current. The motor 12 may be of such construction as to run at 3600 R. P. M. With a two armed tool of the character just referred to, and with the armature shaft operating at 3600 R. P. M., one arm of the tool, assuming a proper initial angular adjustment thereof, will come into contact with the material each time the induced current flow therein is at an approximately zero value. It will be apparent, however, that if desired I could utilize a motor having a speed of 1800 R. P. M., with the tool shown, the tool in such case only being effective at alternative periods of zero current flow. Or, a four armed tool might be utilized at speeds of 1800, 900, or 600 R. P. M.; a six point tool at 1200, 600, or 400 R. P. M., or some other type tool structure driven at any one of a large number of different speeds which will readily suggest themselves from the examples given, it only being necessary that the number of arms be so co-related to the speed of the motor that one arm will engage the material at such time as the current flow therein is at a minimum.

By reference more particularly to Figure 7 of the drawings, this relationship will be more clearly apparent. In this figure, there is illustrated a portion of a sine curve representing three complete cycles herein designated as 19, 20 and 21, respectively. Each of these cycles comprises a crest 22 and a trough 23, thus giving two alternations for each cycle, so that for each alternation there is one point 24 at which the current flow is zero. The relationship of the tool 15 being driven by the synchronous motor may be initially so adjusted, while running, that one of the arms contacts the material at a time when the current flow therein is zero. This adjustment having been initially obtained, the desired synchronism will be subsequently maintained, an arm of the cutter coming into operative engagement with the material only when the current flow therein is substantially zero, and therefore at a time when bridging a gap between the edges will not result in any damage to the material or the apparatus, or interference with the functions which such apparatus is designed to perform. As before pointed out, the synchronous speed of the motor, or the number of arms on a tool, may either or both be varied in such manner that an operation of this character occurs each time the current flow of the material is substantially zero, or only once for each complete cycle, or in any other desired repeated time interval.

In Figure 3 there is illustrated in perspective a slightly modified embodiment of the invention for the purpose of showing more particularly one manner of mounting the motor. In this figure, the motor 26 is illustrated as carried by a seat 27 cooperating with a substantially arcuate support 28. By adjusting the seat 27 relative to the support, the angular relation of the motor may be so adjusted as to change the time at which one of the arms 29 of the tool 30 becomes effective on the material.

I have hereinbefore referred to a tool of such construction as to provide cutting arms effective not only for cleaning the outer surface of the edge portions of the material with which they come into contact, but also effective for removing any surplus hot material therefrom. While such cutting arms may be readily designed to perform an edge aligning function in addition to the cleaning and cutting functions described, there are times when I have found it desirable to either use an entirely separate mechanism for effecting the desired edge alignment, or to slightly modify the construction of the tool whereby it may perform all of the functions stated. In Figure 4, there is illustrated a slightly modified embodiment of the mechanism of Figure 3. In the form of Figure 4, the tool 31 carried by the armature shaft 32, or a suitable extension thereof, is provided with two cutter arms 33 alternating with two seam aligning arms 34. The operation of the cutting arms will be apparent from the description heretofore given. With the motor operating at the synchronous speed for which it is designed, the seam aligning arms would also be caused to bear on the edges of the material and will have the effect of tending to accurately bring such edges into a flush relationship, and thus align the same in proper position for heating and welding.

In Figure 5 there is illustrated another embodiment of the invention in which in dotted lines I have indicated one of the edges E as out of alignment with the opposed edge E', this being the position into which the edges were pre-formed in the original forming operation. If the edges were permitted to remain in this position, it would be apparent that uneven burning away of the edges would necessarily result and that an undesirable sloping or inclined seam would be produced. Cooperating with the edge portions of the material, however, is a beating or straightening structure comprising a series of seam aligning arms 35 carried by a suitable hub 36 secured to a shaft 37, adapted to be driven in synchronous relation to the current flow induced in the material. The arms 35, upon rotation of the shaft 37, will be effective for moving the edge E from its dotted to its full line position, where it will be held because the plate inertia is so great as to prevent a return thereof to its initial position within the period of one alternation. Thus the desired welding results will be obtained, since the edges at the time of welding will be held in substantially square, flush, or aligned abutting relationship.

In Figure 6, I have shown in bottom plan view the structure of Figure 5. In this figure, however, there is illustrated a series of shafts 37 each carrying arms 35, the shafts being driven from a jack shaft 38 through suitable gearing 39. This jack shaft is herein shown as driven by a synchronous motor 40 through the medium of a differential, including main beveled gears 41 and an intermediate pinion 42. By properly adjusting the angular position of this intermediate pinion, it will be apparent that the angular relationship between the jack shaft and the armature shaft may be advanced or retarded, thereby insuring such a relationship of the parts that the beaters or edge aligning means 35 will be in engagement with the material only at periods of substantially current flow therein. While I have illustrated Figure 6 as comprising a series of edge aligning means, it will be apparent that each of the tools therein shown may be of the composite form of Figure 4, or that edge aligning means and cutting means may be alternated or otherwise disposed one with respect to the other.

The utility of the present invention, as before pointed out, is not limited to any particular type of welding apparatus, or to apparatus adapted to produce any particular type of seam. Thus, it will be apparent that it may be advantageously utilized either in connection with the production of a so-called continuous weld, or a so-called stitch weld. It is also adapted to use with current flow of different frequencies, it being apparent that the synchronous speed of the tools may be made such, or the number of arms thereon so varied, that each surface edge portion of the material is efficiently contacted with in case such an operation is desired. While this is usually considered preferable with respect to the operation of the cutting means, it is not so essential to the operation of the edge aligning means, inasmuch as the rapid series of impacts even at separated points is effective, particularly with the heavier gauges of material, to properly align the edge portions. It will be further understood that in place of tools so positioned as to span the seam edges during normal conditions of operation, the tools may, if desired, be so set as to each cooperate with one edge portion only. In such case, however, the synchronous relationship is still desirable inasmuch as any slight misalignment of the material might be such as to result in a tool of such characteristics periodically bridging the gap between the edges and thus short-circuiting the seam at an electrically active instant.

The present invention possesses further advantages in that tools of the character referred to subject the material to a succession of hammerlike blows which are effective for loosening scale from the material and causing the same to drop freely from the outside edges thereof. If inverted welding is being practiced, i. e., welding in which the material is so disposed as to dispose the seam below the same, any such loosened scale is permitted to pass from the inside of the material outwardly between the spaced edges. In this manner, the possibility of inclusion of scale or other foreign material in the seam is minimized.

It is thus seen that the present invention possesses advantages not only with respect to the surface cleanliness of the material being welded whereby a better appearing and stronger weld is insured, but from the mechanical aligning or positioning of the edge portions such that they may be maintained in substantially squarely opposed position during the heating and welding operation.

While I have herein illustrated and described certain preferred embodiments of my invention, and have disclosed the same more particularly in connection with the formation of substantially tubular material, it will be understood that the utility of the invention is not limited with respect to the cross-sectional characteristics or contour of the material being welded, and that changes in the construction and operation may be made without departing either from the spirit of the invention or the scope of my broader claims.

I claim:

1. In an electric seam welder, means for causing alternating welding current to flow across the seam, means for engaging the edges of the seam intermittently, and means for driving said engaging means in synchronism with said alternating current whereby the engagement occurs when the current is substantially a minimum.

2. In an apparatus for welding seams, means for causing the circulation of alternating current across a seam, means engaging the edges of the seam at intervals, and means for driving said engaging means in synchronism with said current.

3. Apparatus for welding seams comprising means for causing a flow of alternating current across a seam, means engaging the seam edges during the heating thereof, and means operating in synchronism with said current for driving said engaging means.

4. A seam welding apparatus comprising means for causing a flow of alternating current across the seam, and electrical conducting means operating synchronously with said current for engaging the edges of the seam only between the alternations of current passing thereacross.

5. A seam welder comprising means for causing periodic current to flow across the seam for heating the edges thereof, cleaning means of electrical conducting characteristics operating synchronously with the variations in said current for engaging the edges of the seam only between successive cycles of said current.

6. A welding apparatus for joining seam edges comprising means producing a flow of periodic current between such edges, and metallic edge-alining means operating synchronously with the variations in said current for engaging the seam edges only between successive cycles of the current.

7. Apparatus for welding seam edges together comprising means for causing a flow of periodic current between said edges, and means of electrical conducting characteristics effective for engaging said edges only between successive variations in said current.

8. In combination with apparatus for welding seam edges together, means for causing a flow of periodically varying current across a seam, a synchronous motor energized by the same source as said means, and a tool driven by said motor and effective to engage the edges of the seam only between pulsations of the current flowing thereacross.

9. In a seam welding apparatus, the combination with means for causing a flow of periodically varying current across the seam, of a synchronous motor connected to the same source of current as said means, and a cutting tool driven by said motor effective to engage the edges of the seam only at spaced intervals corresponding to the frequency of pulsations of the current traversing the same.

10. In an apparatus for welding seam edges together, the combination with means for causing a flow of periodically varying current across a seam, and a source of current for said means, of a synchronous motor connected to said source, and an edge-alining tool driven by said motor for engaging the edges of the seam intermittently in synchronism with the recurrence of zero values of current across said seam.

11. In a welding apparatus for joining seam edges, the combination with a source of alternating current for heating said edges by circulating across the seam, of means engaging the edges of the seam only at instants of substantially zero current flow across the seam, and driving mechanism for said means.

12. Electric welding apparatus for joining seam edges comprising a source of alternating current, means for causing flow of current from said source across a seam, and means of electrical conducting characteristics driven in synchronism with said alteriating current for intermittently engaging the seam edges only at instants of substantially zero current across the seam, for maintaining a predetermined relation of the seam edges.

13. In a method of electrically welding seams, the steps including producing a flow of alternating current across a seam, and successively engaging the seam edges between alternations of welding current for cleaning and alining the edges of the seam.

14. In a method of electically welding seams, the steps including producting a flow of periodically varying current across a seam, and successively engaging the seam edges instantaneously between pulsations of the welding current.

15. In a method of electrically joining seam edges, the steps including causing a periodically varying current to traverse the seam, and mechanically subjecting the seam edges to deforming working contact only between successive pulsations of the welding current.

16. In a method of electrically joining seam edges, the steps including passing a periodically varying current across a seam and mechanically engaging and alining the seam edges only at instants of substantially zero current flow across the seam.

17. In a method of electric welding, the steps including causing a flow of alternating current across the edges of a seam to be joined, and removing surplus metal from the seam intermittently and only at instants of substantially zero current thereacross.

18. In an electric tube welder, mechanism for cleaning the edges of a tube seam comprising a rotating arm, a synchronous motor therefor energized from the same source as the welder, and means for timing the engagement of said arm with the edges of said seam with respect to substantially zero current conditions at the seam.

19. A seam welding apparatus, comprising cross seam pulsating current supply means, a rapidly moving narrow arm surface abrading means contacting intermittently with the surfaces along the seam, a motor driving said abrading means in synchronism with the impulses of said pulsating current, a timer for said abrading means insuring mechnical contact with the surfaces engaged thereby at predetermined times only with respect to the current impulses, and means for applying welding pressure to a heated and abraded seam material.

20. In a method of electric welding, the steps comprising supplying periodically varying heating current across a seam being welded, intermittently mechanically contacting the material surface adjacent the two opposed edges to be welded as they are being heated to high temperature and thereby maintaining said edges in proper alinement with each other, timing the contact periods with successive minima of current pulses, and applying welding pressure to complete the weld.

In testimony whereof I have hereunto set my hand.

JAMES L. ADAMS, Jr.